(12) United States Patent
Hung et al.

(10) Patent No.: US 11,630,800 B2
(45) Date of Patent: Apr. 18, 2023

(54) PROGRAMMABLE VISION ACCELERATOR

(71) Applicant: NVIDIA Corporation, Santa Clara, CA (US)

(72) Inventors: Ching Y. Hung, Pleasanton, CA (US); Jagadeesh Sankaran, Dublin, CA (US); Ravi P. Singh, Austin, TX (US); Stanley Tzeng, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 532 days.

(21) Appl. No.: 15/141,703

(22) Filed: Apr. 28, 2016

(65) Prior Publication Data

US 2016/0321074 A1 Nov. 3, 2016

Related U.S. Application Data

(60) Provisional application No. 62/156,167, filed on May 1, 2015.

(51) Int. Cl.
*G06F 9/30* (2018.01)
*G06F 15/82* (2006.01)
(Continued)

(52) U.S. Cl.
CPC ............ *G06F 15/82* (2013.01); *G06F 9/3001* (2013.01); *G06F 9/3013* (2013.01);
(Continued)

(58) Field of Classification Search
CPC ............ G06F 15/8061; G06F 9/30072; G06F 15/82; G06F 9/3001; G06F 9/325;
(Continued)

(56) References Cited

U.S. PATENT DOCUMENTS 6,986,131 B2 * 1/2006 Thompson ............ G06F 8/4452
712/233
8,024,717 B2 * 9/2011 Yoo ........................ G06F 8/4452
717/150
(Continued)

*Primary Examiner* — Jyoti Mehta
*Assistant Examiner* — Kasim Alli
(74) *Attorney, Agent, or Firm* — Artegis Law Group, LLP

(57) ABSTRACT

In one embodiment of the present invention, a programmable vision accelerator enables applications to collapse multi-dimensional loops into one dimensional loops. In general, configurable components included in the programmable vision accelerator work together to facilitate such loop collapsing. The configurable elements include multi-dimensional address generators, vector units, and load/store units. Each multi-dimensional address generator generates a different address pattern. Each address pattern represents an overall addressing sequence associated with an object accessed within the collapsed loop. The vector units and the load store units provide execution functionality typically associated with multi-dimensional loops based on the address pattern. Advantageously, collapsing multi-dimensional loops in a flexible manner dramatically reduces the overhead associated with implementing a wide range of computer vision algorithms. Consequently, the overall performance of many computer vision applications may be optimized.

21 Claims, 5 Drawing Sheets

(51) Int. Cl.
  *G06F 9/32* (2018.01)
  *G06F 9/38* (2018.01)
  *G06F 9/345* (2018.01)
  *G06F 9/34* (2018.01)
  *G06F 12/02* (2006.01)
  *G06F 15/80* (2006.01)

(52) U.S. Cl.
  CPC ...... *G06F 9/30036* (2013.01); *G06F 9/30072* (2013.01); *G06F 9/325* (2013.01); *G06F 9/342* (2013.01); *G06F 9/345* (2013.01); *G06F 9/383* (2013.01); *G06F 12/0207* (2013.01); *G06F 15/8061* (2013.01)

(58) Field of Classification Search
  CPC ........ G06F 9/342; G06F 9/345; G06F 9/3013; G06F 9/383; G06F 9/30036; G06F 9/30065; G06F 15/806; G06F 9/20065; G06F 12/0207
  See application file for complete search history.

(56) References Cited

U.S. PATENT DOCUMENTS

| | | | |
|---|---|---|---|
| 8,713,285 B2* | 4/2014 | Rakib | G06F 9/345 |
| | | | 711/217 |
| 9,003,165 B2* | 4/2015 | Rakib | G06F 9/3885 |
| | | | 711/217 |
| 2014/0188961 A1* | 7/2014 | Plotnikov | G06F 8/4441 |
| | | | 708/201 |
| 2014/0189287 A1* | 7/2014 | Plotnikov | G06F 9/30145 |
| | | | 712/3 |

\* cited by examiner

Conventional Application Code 410

```
void filter_short(short *data, short *coef, short* out,
            int kw, int kh, int qbits, int blkw,
            int blkh, int lofst_data, int lofst_out)
{
   ...
   for (int i4=0 ; i4<blkh; i4++) {
       for (int i3=0 ; i3<blkw; i3+=vecw) {
           acc = 0;
           for (int i2=0 ; i2<kh; i2++) {
               for (int i1=0 ; i1<kw; i1++) {
                   vdata = data[idx_data++];
                   scoef = coef[idx_coef++];
                   vacc += vdata * scoef;
               }
               idx_data += lofst_data - kw;
           }
           vacc = (vacc + rnd_add) >> qbits;
           out[idx_out++] = vacc;
           idx_data += vecw - lofst_data*kh;
           idx_coef = 0;
       }
       idx_data += lofst_data - blkw;
       idx_out += lofst_out - blkw;
   }
}
```

Four Dimensional Loop 420

Collapsed Application Code 430

```
void filter_short_pva(short *data, short *coef, short* out,
            int kw, int kh, int qbits, int blkw,
            int blkh, int lofst_data, int lofst_out)
{
   Agen A0 = new Agen(4, data, kw, kh, blkw/vecw, blkh,
                      1, lofst_data, vecw, lofst_data);
   Agen A1 = new Agen(2, coef, kw, kh, 1, kw);
   Agen A2 = new Agen(2, out, blkw/vecw, blkh, vecw, lofst_out);
   niter_out = blkh * (blkw/vecw);
   niter_in  = kh * kw;
   niter = niter_out * niter_in;
   pred_madd = 0;
   pred_store = niter_in-1;
   for (int i=0; i<niter; i++) {
       vload_dhp(A0, vdata_lo, vdata_hi);
       vcoef = vload_hs(A1);
       vacc_lo = vmaddh(vdata_lo, vcoef, vacc_lo, 0, pred_madd);
       vacc_hi = vmaddh(vdata_hi, vcoef, vacc_hi, 0, pred_madd);
       if (!pred_store) vstore_dhp(A2, vacc_lo, vacc_hi, qbits);
       pred_madd  = (pred_madd == niter_in-1)? 0: (pred_madd+1);
       pred_store = (pred_store== 0)? (niter_in-1): (pred_store-1);
   }
}
```

Loop Configuration Instructions 440

One Dimensional Loop Instructions 450

FIGURE 4

PROGRAMMABLE VISION ACCELERATOR

CROSS-REFERENCE TO RELATED APPLICATIONS

This application claims benefit of the United States Provisional Patent Application having Ser. No. 62/156,167 and filed on May 1, 2015. The subject matter of this related application is hereby incorporated herein by reference.

BACKGROUND OF THE INVENTION

Field of the Invention

Embodiments of the present invention relate generally to computer processing and, more specifically, to a programmable vision accelerator.

Description of the Related Art

Computer vision is the process of automatically perceiving, analyzing, understanding, and/or interpreting visual data. Such visual data may include any combination of videos, images, real-time or near real-time data captured by any type of camera or video recording device, and the like. Computer vision applications implement computer vision algorithms to solve high level problems in a variety of fields. For example, an advanced driver assistance system (ADAS) application can implement real-time object detection algorithms to detect pedestrians/bikes, recognize traffic signs, and/or issue lane departure warnings based on visual data captured by an in-vehicle camera or video recording device.

Some computer vision applications configure central processing units (CPUs) to implement the relevant computer vision algorithms. Because a CPU can be configured using high-level programming language, such as the C programming language, CPUs are typically capable of executing a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications.

In an effort to meet performance requirements, such as those described above, other design approaches involve configuring specialized hardware units to execute computer vision applications. The specialized hardware units may incorporate circuitry optimized for specific types of computer vision algorithms and may be tuned to efficiently process limited amounts or types of visual data. One drawback of specialized hardware units, however, is that many such units have to be configured using low-level programming techniques. Accordingly, configuring specialized hardware units to implement a wide variety of computer vision algorithms across a wide breadth of visual data is impractical, if not impossible. For example, some specialized hardware units support a limited number of nested loops. If a computer vision algorithm requires more nested loops than a particular hardware unit allows, then the computer vision algorithm cannot execute on the hardware unit. Because many areas of computer vision, such as ADAS, are associated with a diverse and continually evolving domain of computer vision algorithms and types of visual data, being able to effectively implement a wide variety of computer vision applications requires more flexibility than can provided by specialized hardware units.

As the foregoing illustrates, what is needed in the art is a more effective and flexible hardware architecture for executing computer vision applications.

SUMMARY OF THE INVENTION

One embodiment of the present invention sets forth a system for executing a collapsed multi-dimensional loop. The system includes a memory that stores a loop configuration instruction specifying a number of dimensions associated with the collapsed multi-dimensional loop and a plurality of loop instructions included in a one-dimensional loop; a multi-dimensional address generator that generates an address pattern based on the number of dimensions; a load/store unit that accesses an object based on the address pattern and a first loop instruction included in the plurality of loop instructions; and a vector unit that performs one or more operations on the object based on a second loop instruction included in the plurality of loop instructions.

One advantage of the disclosed techniques is that they enable a wide range of computer vision applications to meet performance requirements, such as those related to execution time and power consumption, for example. By contrast, conventional approaches to executing computer vision applications often involve sacrificing flexibility or performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a comparative illustration between conventional application code and the collapsed application code that the vector processor of FIG. 3 is configured to execute, according to various embodiments of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
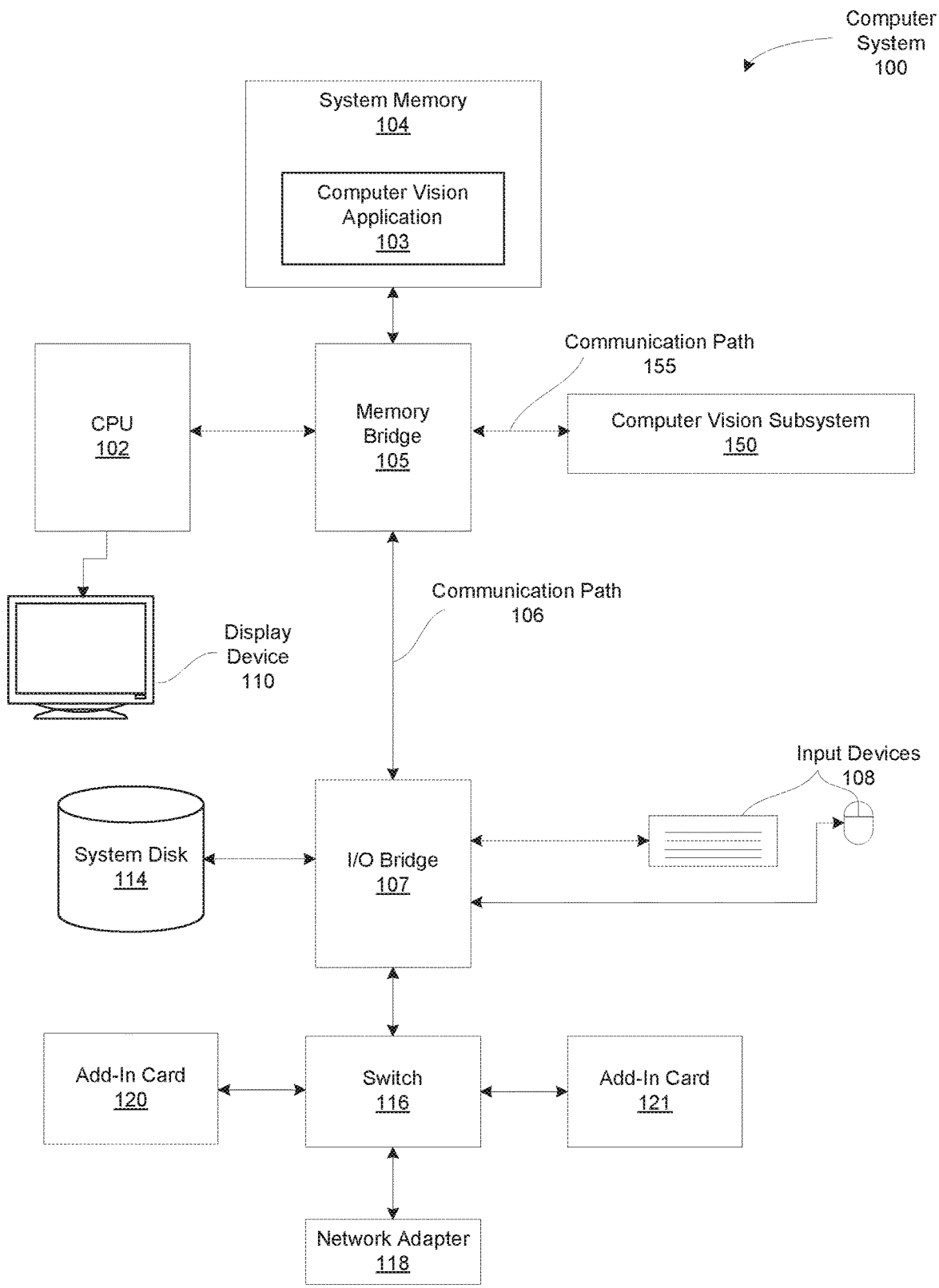
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a computer vision subsystem 150 via a memory bridge 105 and a communication path 155. The memory bridge 105 is further coupled to an I/O (input/output) bridge 107 via a communication path 106, and the I/O bridge 107 is, in turn, coupled to a switch 116.

In operation, the I/O bridge 107 is configured to receive user input information from input devices 108, such as a keyboard or a mouse, and forward the input information to the CPU 102 for processing via the communication path 106 and the memory bridge 105. The CPU 102 is the master processor of computer system 100, controlling and coordinating operations of other system components. In particular, the CPU 102 controls and coordinates operations of the computer vision subsystem 150. In some embodiments, the CPU 102 delivers pixels to a display device 110 that may be any conventional cathode ray tube, liquid crystal display, light-emitting diode display, or the like. The switch 116 is configured to provide connections between the I/O bridge 107 and other components of the computer system 100, such as a network adapter 118 and various add-in cards 120 and 121.

As also shown, the I/O bridge 107 is coupled to a system disk 114 that may be configured to store content and applications and data for use by the CPU 102 and the computer vision subsystem 150. As a general matter, the system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 107 as well.

In various embodiments, the memory bridge 105 may be a Northbridge chip, and the I/O bridge 107 may be a Southbridge chip. In addition, the communication paths 106 and 155, as well as other communication paths within computer system 100, may be implemented using any technically suitable protocols, including, without limitation, AGP (Accelerated Graphics Port), HyperTransport, or any other bus or point-to-point communication protocol known in the art.

As shown, the system memory 104 includes any number of computer vision applications 103. The system memory 104 may be any type of volatile or non-volatile memory capable of storing data and the computer vision applications 103, such as a random access memory (RAM), a read-only memory (ROM), an erasable programmable read-only memory (EPROM or Flash ROM), or any suitable combination of the foregoing. The system memory 104 may be implemented using one or more integrated circuit devices, application specific integrated circuits (ASICs), or memory devices, or in any other technically feasible fashion.

The computer vision application 103 comprises executable code and may execute on the CPU 102, the computer vision subsystem 150, or any combination thereof. In general the computer vision application 103 configures the computer system 100 to automatically perceive, analyze, understand, and/or interpret visual data. For example, the computer vision application 103 could comprise an advanced driver assistance system (ADAS) application that implements real-time object detection algorithms to detect pedestrians/bikes, recognize traffic signs, and/or issue lane departure warnings based on visual data captured by an in-vehicle camera or video recording device. However, the CPU 102 is oftentimes unable to meet the performance requirements of many computer vision applications 103, such as those related to execution time and power consumption, for example. In particular, the CPU 102 is typically unable to execute complex object detection algorithms in real-time, which is a requirement of in-vehicle ADAS applications.

In an effort to meet performance requirements, such as those described above, conventional design approaches involve configuring specialized hardware units to execute the computer vision applications 103. The specialized hardware units may incorporate circuitry optimized for specific types of computer vision algorithms and may be tuned to efficiently process limited amounts or types of visual data. One drawback of specialized hardware units, however, is that many such units have to be configured using low-level programming techniques. Accordingly, configuring specialized hardware units to implement a wide variety of computer vision algorithms across a wide breadth of visual data is impractical, if not impossible. As a general matter, such specialized hardware units do not provide the flexibility required to support many computer visions fields.

For example, ADAS is an emerging field that does not have a standardization body that mandates processing algorithms and systems. Consequently, ADAS applications implement a diverse range of computer vision algorithms across a wide variety of visual data. While specialized hardware units may meet the performance requirements of some ADAS applications, the specialized hardware units will typically be unable to meet the performance requirements of many other ADAS applications. Further, commercial interest in ADAS is increasing and specialized hardware units do not typically provide the flexibility required to scale the computer vision applications 103 to address multiple segments of the ADAS market that may have different feature needs and performance requirements.

To address the performance and flexibility requirements for a wide range of computer vision fields, the computer system 100 includes the computer vision subsystem 150. In general, the computer vision subsystem 150 provides an architecture that includes programmable features to accelerate the execution of relatively common computer vision algorithms as well as generic image signal processing operations. More specifically, the computer vision subsystem 150 incorporates configurable circuitry designed to efficiently execute a wide range of computer vision algorithms across a wide range of visual data.

In various embodiments, the computer system 100 enables the computer vision applications 103 to configure the computer vision subsystem 150 based on high-level programming techniques. For example, in some embodiments, the computer system 100 includes a compiler that generates the executable computer vision application 103 that executes on the computer vision subsystem 150. The input to the compiler may be source code written in any number of high-level programming languages, such as the C programming language. In other embodiments, the computer vision system 100 may provide a high-level application programming interface (API) that enables the computer vision application 103 to efficiently configure the computer vision subsystem 150.

In various embodiments, the computer vision subsystem 150 may be integrated with one or more of the other components of FIG. 1 to form a single system. For example, the computer vision subsystem 150 may be integrated with the CPU 102 and other connection circuitry on a single chip to form a system on chip (SoC). In alternate embodiments, the computer system 100 may not include the CPU 102, and the computer vision subsystem 150 may execute as a stand-alone computer system. Systems incorporating the computer vision subsystem 150 may be implemented in a variety of configurations and form factors, including, without limitation, desktops, laptops, handheld personal computers or other handheld devices, servers, workstations, game consoles, automotive head units, embedded systems, and the like.

It will be appreciated that the system shown herein is illustrative and that variations and modifications are possible. The connection topology, including the number and arrangement of bridges, the number of the CPUs 102, and the number of the computer vision subsystems 150 may be modified as desired. For example, in some embodiments, the system memory 104 could be connected to the CPU 102 directly rather than through the memory bridge 105, and other devices would communicate with the system memory 104 via the memory bridge 105 and the CPU 102. In other alternative topologies, the computer vision subsystem 150 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

Figure 2:
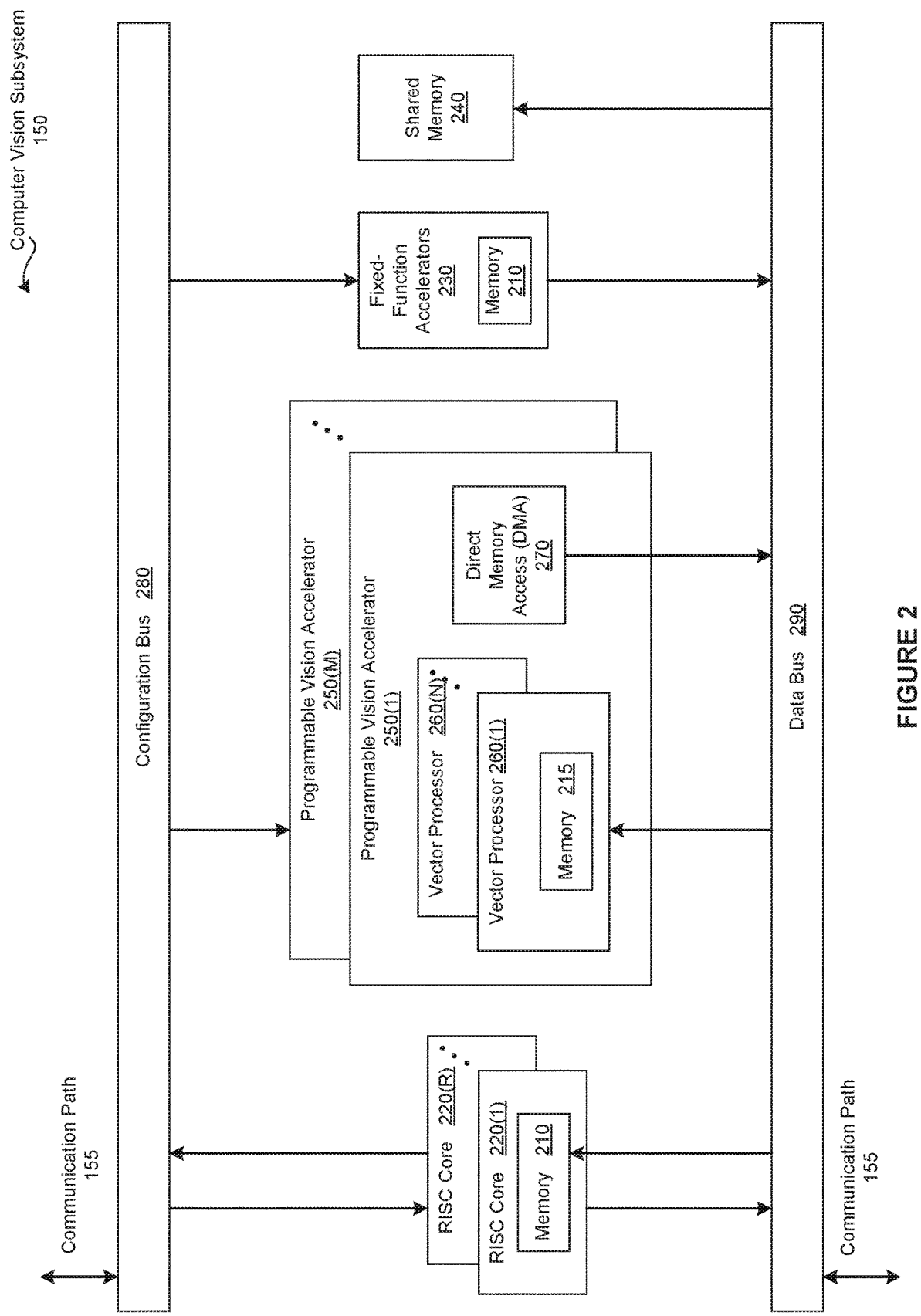
FIG. 2 is a more detailed block diagram of the computer vision subsystem of FIG. 1, according to various embodiments of the present invention.

FIG. 2 is a more detailed block diagram of the computer vision subsystem 150 of FIG. 1, according to various embodiments of the present invention. As shown, the computer vision subsystem 150 includes, without limitation, any number of reduced instruction set computer (RISC) cores 220, any number of fixed-function accelerators (FFAs) 230, any number of programmable vision accelerators (PVAs) 250, a shared memory 240, a configuration bus 280, and a data bus 290. For explanatory purposes, multiple instances of like objects are denoted with reference numbers identifying the object and parenthetical numbers identifying the instance where needed.

The RISC cores 220 interact with the CPU 102 of FIG. 1 and coordinate and synchronize the FFAs 230 and the PVAs 250. In some embodiments, the RISC cores 220 also interact with image sensors, image signal processor(s), and the like. Each of the RISC cores 220 includes, without limitation, any amount and type of memory 210. The RISC cores 220 may operate in any technically feasible fashion using any protocols as known in the art. For example, in some embodiments, the RISC cores 220 execute a real-time operating system (RTOS). The RISC cores 220 may be implemented using one or more integrated circuit devices, application specific integrated circuits (ASICs), or memory devices, or in any other technically feasible fashion.

Together, the FFAs 230 and the PVAs 250 execute many of the processing operations associated with the computer vision applications 103. The FFAs 230 are hardware blocks that are designed to accelerate established processing operations commonly associated with the computer vision applications 103. For example, in some embodiments, the FFAs 230 may include a convolution neural network, an optical flow engine, and a stereo vision engine. In various embodiments, the FFAs 230 may be designed to optimize any combination of execution speed, area, power, and the like. The FFAs 230 may include any amount and type of the memory 210 and the memory 210 may be implemented in any technically feasible fashion.

By contrast, the PVAs 250 are programmable hardware blocks that accelerate common computer vision algorithms and generic signal processing capabilities. In general, the PVAs 250 are designed to provide an optimized balance between performance and flexibility. As shown, each of the PVAs 250 include, without limitation, a direct memory access (DMA) 270 and any number of vector processors 260. In alternate embodiments, each of the vector processors 260 may include a different instance of the DMA 270.

The DMA 270 enables components included in the computer vision subsystem 150 to access the system memory 104 independently of the CPU 102. Further, in some embodiments, the computer vision subsystem 150 includes the shared memory 240. The shared memory 240 may be any amount and type of memory and the shared memory 240 may be implemented in any technically feasible fashion. For example, the shared memory 240 could be a 256 kilobyte (KB) random access memory (RAM). In such embodiments, components included in the computer vision subsystem 150 may exchange data through the DMA 270 without accessing external memory. The DMA 270 may include any number of other features that further optimize the performance of the computer vision subsystem 150. In various embodiments, the DMA 270 supports multi-dimensional addressing and/or circular addressing. More specifically, in some embodiments, the DMA 270 supports as many as six dimensions of addressing. The six dimensions may include, for example, block width, block height, block depth, horizontal block stepping, vertical block stepping, and depth stepping.

The vector processors 260 are programmable processors that are designed to efficiently and flexibly execute programming common computer vision algorithms and provide generic signal processing capabilities. Each of the vector processors 260 is provided with an instruction cache (not shown in FIG. 2) and any amount of memory 215. Consequently, in some embodiments, each of the vector processors 260 may be configured to execute independently of the other vector processors 260. In other embodiments, the vector processors 260 that are included in a particular PVA 250, may be configured to employ data parallelism. For example, in some embodiments, the vector processors 260 included in a particular PVA 250 may execute the same computer vision algorithm, but on different regions of an image.

The instruction cache and the memory 215 may be implemented in any technically feasible fashion. Further, the instruction cache and/or the memory 215 may be designed to support and/or optimize any characteristic of the computer vision subsystem 150. For example, in some embodiments, the instruction cache may support a 256-bit data read bus to support very long instruction word (VLIW) instructions. In another example, in some embodiments, the memory 215 may be configured to optimize data access patterns commonly associated with computer vision algorithms.

The configuration bus 280 transmits relatively low-bandwidth control signals. By contrast, the data bus 290 transmits relatively high-bandwidth data signals. The RISC cores 220 are masters of the configuration bus 280. Configuration registers (not shown) included in the RISC cores 220, the PVAs 250, and the FFAs 230 are slaves of the configuration bus 280. The RISC cores 220, the DMAs 270, and the FFAs 230 are masters of the data bus 290. The memories 210, the memory 215, and the shared memory 240 are slaves of the data bus 290. The configuration bus 280 and the data bus 290 are connected to the memory bridge 105 of FIG. 1 via the communication path 155.

It will be appreciated that the architecture described herein is illustrative and that variations and modifications are possible. Among other things, any number of PVAs 250 may be included in the computer vision subsystem 150, any number of vector processors 260 may be included in each of the PVAs 250, a hardware sequencer may be included in the computer vision subsystem 150, etc. Further, the computer vision subsystem 150 may implement any number and type of communication mechanisms instead of the configuration bus 280, the data bus 190, and the communication path 155.

Figure 3:
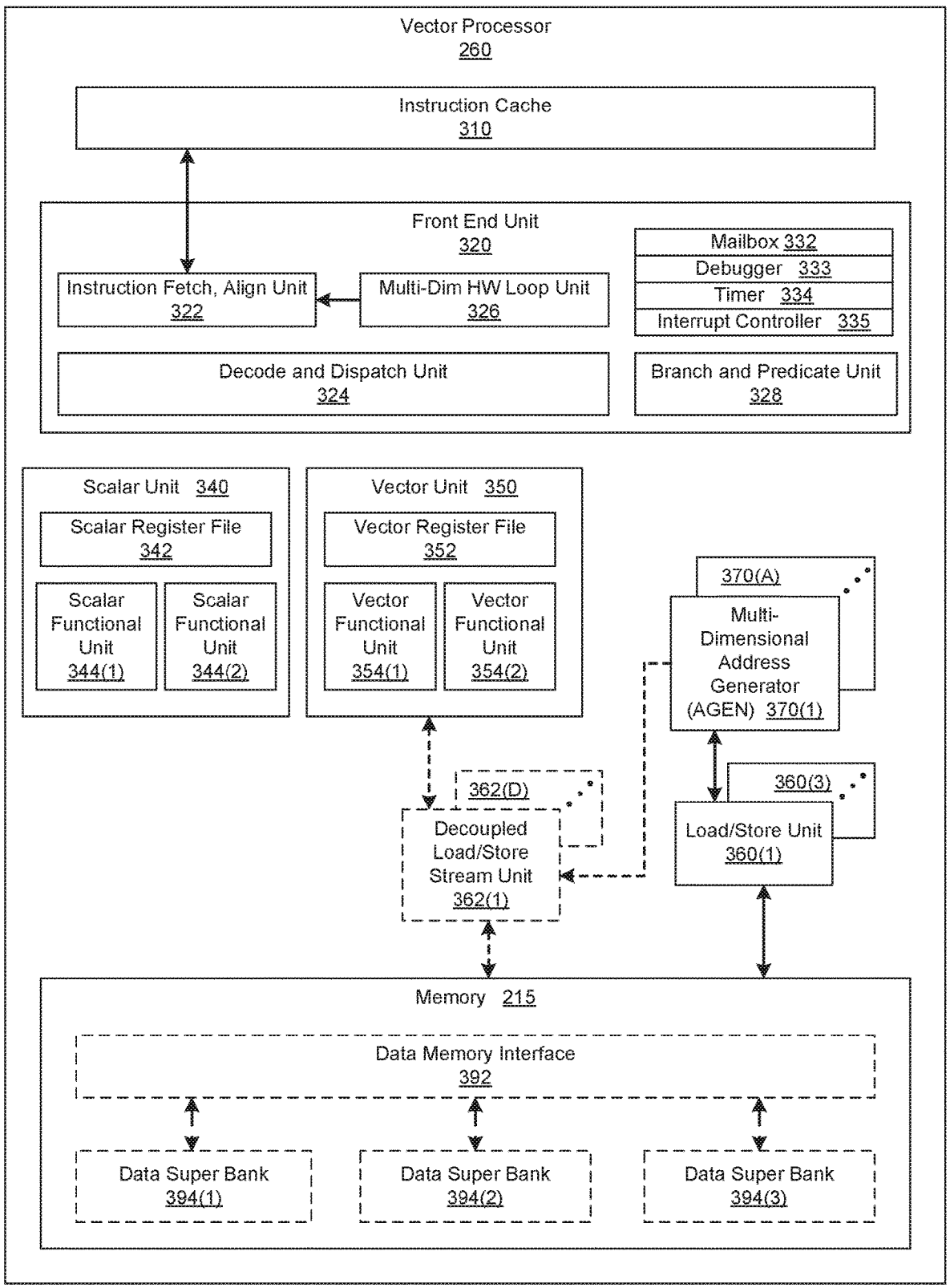
FIG. 3 is a more detailed block diagram of the vector processor of FIG. 2, according to various embodiments of the present invention.

FIG. 3 is a more detailed block diagram of the vector processor 260 of FIG. 2, according to various embodiments of the present invention. As shown, the vector processor 260 includes, without limitation, any number of multi-dimensional address generators (AGENs) 370, any number of load/store units 260, the memory 215, any number of vector units 350, any number of scalar units 340, a front end unit 320, and an instruction cache 310.

Further, the vector unit 350 includes, without limitation, a vector register file 352 and two vector functional units 354. The scalar unit 340 includes, without limitation, a scalar register file 342 and two scalar functional units 344. The front end unit 320 includes, without limitation, a branch and predicate unit 328; a multi-dimensional hardware loop unit 326; an instruction, fetch, align unit 322; a decode and dispatch unit 324; a mailbox 322; a debugger 333; a timer 334; and an interrupt controller 335.

The multi-dimensional address generators (AGENs) 370, the load/store units 360, the memory 215, the vector units 350, the scalar units 340, the front end unit 320, and the instruction cache 310 may be implemented using one or more integrated circuit devices, such as programmable processors, application specific integrated circuits (ASICs), or memory devices, or in any other technically feasible fashion. For example, in some embodiments, the instruction cache 310 may be a static random access memory (SRAM).

Enabling Multi-Dimensional Loop Collapsing

As a general matter, the vector processor 260 is designed to provide a hardware architecture that efficiently executes a wide range of the computer vision applications 103. More specifically, the vector processor 260 enables the computer vision applications 103 to program the vector processor 260 to efficiently execute common computer vision algorithms. One particularly inefficient operation that is performed as part of many common computer vision algorithms is multi-dimensional looping. For instance, many common computer vision algorithms involve performing filtering operations on a "neighborhood" of pixels (e.g., a 2-by-2 block of proximally located pixels). To perform the filtering operations, conventional computer vision applications typically execute operations on pixels within a hierarchy of nested loops.

A conventional application that specifies multi-dimensional looping includes many "overhead" instructions that configure the processor to sequentially access the appropriate address associated with an object and conditionally execute operations based on iteration variables. Oftentimes, executing the overhead instructions unacceptably reduces the overall performance of the conventional processor. Further, while a specialized hardware unit may be designed to efficiently execute multi-dimensional loops for a set of specific dimensions, the specialized hardware unit is unable to efficiently execute multi-dimensional loops across many sets of dimensions. Developing specialized hardware units to support the various sets of dimensions required for many computer vision applications 103 would be prohibitively time consuming.

To enable the computer vision applications 103 to execute multi-dimensional looping functionality efficiently and flexibly, the vector processor 260 provides architectural support for programmable "loop collapsing." Loop collapsing is the process of emulating the functionality of a nested multi-dimensional loop within a "zero-overhead" one dimensional loop. As referred to herein, a zero overhead loop does not include explicit branch or end-of-loop instructions. To facilitate efficient loop collapsing, each of the multi-dimensional address generators 370 may be independently configured to generate addresses associated with a particular object based on an address pattern. The address pattern encodes various address modifiers that emulate the multi-dimensional functionality as the object is repeatedly accessed inside a one dimensional loop. The address modifiers are also referred to herein as step sizes.

For example, the following equation (1) computes six dimensional addresses for an object accessed via a "base" address, with a size of "object_size," for the iteration variables i1-i6, and the iteration weights w1-w6:

$$\text{address}=\text{base}+\text{object\_size}*(i1*w1+i2*w2+i3*w3+i4*w4+i5*w5+i6*w6) \quad (1)$$

To efficiently implement equation (1), each of the multi-dimensional address generators 370 pre-computes address modifiers mod1-mod6 based on iteration counts n1-n6 and the iteration weights w1-w6. As referred to herein, each of the iteration variables iterates from 0 (inclusive) to the corresponding iteration count (exclusive). Accordingly, the iteration variable i1 iterates from 0 to (n1−1), the iteration variable i2 iterates from 0 to the (n2−1), and so forth. More precisely, while executing configuration instructions prior to executing one dimensional collapsed loop instructions, each of the multi-dimensional address generator 370 computes the address modifiers mod1-mod6 based on the following pseudo-code (2):

```
Inside i1 loop:
    mod1 = w1
When i1 is reset and i2 is incremented:
    mod2 = w2 − (n1 − 1)*w1
When i1 and i2 are reset and i3 is incremented:
    mod3 = w3 − (nr2 − 1)*w2 − (n1 − 1)*w1
When i1, i2 and i3 are reset and i4 is incremented:
    mod4 = w4 − (n3 − 1)*w3 − (n2 − 1) * w2 − (n1 − 1)*w1
When i1, i2, i3 and i4 are reset and i5 is incremented:
    mod5 = w5 − (n4 − 1)*w4 − (n3 − 1)*w3 − (n2 − 1) * w2 −
        (n1 − 1)*w1
When i1, i2, i3, i4 and i5 are reset and i6 is incremented:
    mod6 = w6 − (n5 − 1)*w5 − (n4 − 1)*w4 − (n3 − 1)*w3 −
        (n2 − 1) * w2 − (n1 − 1)*w1
```

Subsequently, as the one dimensional collapsed loop instructions execute, each object is accessed via the address generated by the associated multi-dimensional address generator 370 based on the address pattern established by the address modifiers. After generating the address, the associated multi-dimensional address generator 370 steps through the iteration variables i1-i6 based on the following pseudo-code:

```
if (++i1 >= n1) {
    i1 = 0;
```

-continued

```
if (++i2 >= n2) {
    i2 = 0;
    if (++i3 >= n3) {
        i3 = 0;
        if (++i4 >= n4) {
            i4 = 0;
            if (++i5 >= n5) {
                i5 = 0;
                if (++i6 >= n6) {
                    i6 = 0;
                }
            }
        }
    }
}
```

For explanatory purposes, equations (1)-(3) illustrate computations for six dimensions of nested loops. However, in alternate embodiments, the architecture of the multi-dimensional address generators 370 may provide configurable support for more or less than six dimensions of nested loops. Further, each of the multi-dimensional address generators 270 may be configured to generate an address pattern based on any supported number of dimensions.

For example, suppose that a particular multi-dimensional address generator 370 is configured to implement the following: base=0, item_size=1, w1=1, w2=2, n1=4, and n2=2. In such a scenario, the multi-dimensional address generator 370 would produce the address pattern: "0, 1, 2, 3, 2, 3, 4, 5" irrespective of whether the multi-dimensional address generator 370 supports six dimensions of nested loops or nine dimensions of nested loops. In general, the addresses produced by the multi-dimensional address generator 370 do not necessarily vary by a fixed amount. Instead, the addresses follow a weighted summation based on the configuration of the multi-dimensional address generator 370.

Notably, each of the multi-dimensional address generators 370 may be configured to compute the multi-dimensional address pattern for a different object based on a number of dimensions, a base address, a number of iterations for each dimension, and a weight for each dimension. For example, the multi-dimensional address generator 370(2) may be configured to generate a two dimensional address pattern for the object "coef" based on the following pseudo-code instruction "Agen a2=new Agen(2, coef, kw, kh, 1, kw)."

In various embodiments, each of the load/store units 360 may be configured to compute addresses based on the multi-dimensional address generators 370. The load/store unit 360 executes a load/store operation on an object via the computed address. Subsequently, the load/store unit 360 increments/decrements the computed address via the multi-dimensional address generator 370 associated with the object. Each of the load/store units 360 may be associated with a particular multi-dimensional address generator 370 in any technically feasible fashion. For example, in some embodiments, each of the load/store units 360 stores an identifier for the associated multi-dimensional address generator 370 as an AGEN parameter in memory. In alternate embodiments, any number of the load/store units 360 may be configured to support index and post-modify addressing modes based on conventional techniques.

In some embodiments, to further reduce the number of overhead instructions included in loops of common computer vision algorithms, each of the load/store units 360 includes rounding and/or saturation logic in the store datapath. In general, the rounding and/or saturation logic may implement any number of options and be configured in any technically feasible fashion. For example, in some embodiments, the rounding and saturation logic may be configured via, respectively, a rounding parameter and a saturation parameter. In some such embodiments, the rounding parameter may specify a rounding shift from 0-31 or a truncate-vs-round option. The saturation parameter may specify no saturation, signed N-bit saturation, unsigned N-bit saturation (where N is tied to the store data type), or an arbitrary lower-bound/upper-bound saturation.

In alternate embodiments, the load/store units 360 may implement any number and type of configurable parameters instead of or in addition to the rounding and saturation parameters. For example, in some embodiments, the load/store units 360 may support a data type parameter that specifies a configurable data type and/or a data distribution parameter that specifies a configurable data distribution option. In various embodiments, the load/store units 360 may support the following data types (4) and data distribution options (5):

(4) W: word (32-bit element in memory to/from 48-bit register lane)
H: half-word (16-bit element to/from 24-bit lane)
B: byte (8-bit element to/from 12-bit lane)
HW: half-word to word (16-bit element to/from 48-bit lane)
BH: byte to half-word (8-bit element to/from 24-bit lane)
BW: byte to word (8-bit element to/from 48-bit lane)

(5) P: parallel (1-to-1)
S: scalar (load 1 element and broadcast to all lanes, store first lane)
US2: upsample by 2 (load N/2 elements and duplicate into N lanes, store N/2 lanes and duplicate into N elements)
DS2: downsample by 2 (load every-other elements to lanes, store every-other-lane to memory)
COL: collating store (store with predication and compressed)
EXP: expanding load (load and expand, opposite of collating store)
T: transposition, or constant offset between elements
C: custom permutation (use small LUT to map N elements in memory to/from N vector lanes)

To perform effective loop collapsing, the vector processor 260 also enables the computer vision applications 103 to configure the frequency with which instructions are executed. More specifically, the branch and predicate unit 328 may be configured to generate one or more flags that are attached to instructions and control conditional execution of the instructions. The branch and predicate unit 328 may generate the flags in any technically feasible fashion. In general, the branch and predicate unit 328 includes a set of predicate registers (not shown) and logic to support a set of instructions that read, modify, and/or write to the predicate registers. In some embodiments, the branch and predicate unit 328 includes one or more modulo counters (not shown). Each of the modulo counters generates a flag that is characterized by a configurable period. In some such embodiments, a predication register is initialized with a constant and then updated per iteration by modular increment or decrement operations to generate a periodic flag.

The vector units 350 and the load/store units 360 may be configured to conditionally execute operations based on the flags. For example, the pseudo-code instruction "vacc=vmaddh(vdata, vcoef, vacc, RND_0, pred_madd)" combined with the pseudo-code instruction pred_madd=

(pred_madd==ntaps−1) ? 0: (pred_madd+1),'' configure the vector functional unit 354 to conditionally execute multiply-add or multiply vector operations based on the periodic flag "pred_madd." In particular, the pseudo-code instructions cause the vector unit 350 to initialize the accumulator during the first of every ntaps iterations. By contrast, the pseudo-code instruction "if !(pred_store) vstore_hp(A2, vacc, qbits)" combined with the pseudo-code instruction "pred_store=(pred_store==ntaps−1) ? 0: (pred_store+1)," configure the load/store unit 360 to execute a store operation during the last of every ntaps iterations.

As a general matter, the vector processor 260 executes instructions that the vector processor 260 receives from the compute vision application 103 via the instruction cache 310. The instruction cache 310 is a cache that includes a 256-bit data read bus to support very long instruction word (VLIW) instructions. The VLIW instruction format is a 7-way VLIW. Each instruction is encoded in 32 bits, and the instruction encoding supports variable-length instructions. Consequently, each execution packet includes 1-7 32-bit words. In alternate embodiments, the size of the instruction cache 310 may vary, the data read bus may support any number of bits, and the instruction cache 310 may implement any number and type of instructions and/or instruction formats in any technically feasible fashion.

As mentioned in conjunction with FIG. 2, it will be appreciated that the architecture described herein is illustrative and that variations and modifications are possible. Among other things, any number of multi-dimensional address generators 370, any number of load/store units 360, and any number of vector units 350 may be included in the vector processor 260. Further, as persons skilled in the art will recognize, variations and modifications are possible. For example, in some embodiments, the multi-dimensional address generator 370 may pre-compute and store specific addresses as an overall address pattern in memory prior to executing the one dimensional collapsed loop. In another example, in some embodiments, the multi-dimensional address generator 370 may support from two to nine levels of multi-dimensional looping instead of two to six levels. In yet another example, in some embodiments, the connection between the components included in the vector processor 260 may be varied.

In alternate embodiments, the vector processor 260 may implement any number of other features to optimize the performance of the vector processor 260 while executing the computer vision applications 103. For example, in various embodiments and as depicted with dotted lines and described in detail below, the memory 215 may include a data memory interface 392 and multiple data super banks 394. In another example, in various embodiments and as also depicted with dotted lines and described in detail below, the vector processor 260 may implement any number of decoupled load/store steam units 262. As a general matter, persons of ordinary skill in the art will appreciate that the architecture described in FIGS. 1-3 in no way limits the scope of the present invention.

FIG. 4 is a comparative illustration between conventional application code 410 and collapsed application code 480 that the vector processor 260 of FIG. 3 is configured to execute, according to various embodiments of the present invention. For explanatory purposes only, the context of FIG. 4 is that the computer vision application 103 originally implements the conventional application code 410 that does not rely on the loop collapsing functionality provided by the vector processor 260. Because of the overhead associated with the multi-dimensional loop included in the conventional application code 410, the computer vision application 103 is unable to meet execution speed and/or power requirements when executing on the vector processor 260. Consequently, the computer vision application 103 is redesigned to implement the collapsed application code 430 that relies on the loop collapsing functionality provided by the vector processor 260. The computer vision application 103 then meets the execution speed and power requirements when executing on the vector processor 260.

As shown, the conventional application code 410 implements a two-dimensional finite impulse response (FIR) filter as a four-dimensional nested for loop. Notably, the conventional application code 410 specifies four loop indices: i1, i2, i3, and i4. As also shown, the vector processor 260 is configured to perform a multiply-add operation in the innermost loop. As persons skilled in the art will recognize, the vector processor 260 is configured to perform other operations, such as rounding, store, address updates in addition to any epilog/prolog associated with computer software pipelining, in the outer loops. However, because the vector processor 260 does not perform multiply-add operations in the outer loops, the processing resources associated with the vector processor 260 are under-utilized. This under-utilization of the vector processor 260 combined with the loop overhead significantly degrades the performance of the vector processor 260.

By contrast, the collapsed application code 430 implements the two-dimensional FIR filter as a one dimensional collapsed loop. As shown, the collapsed application code 420 includes loop configuration instructions 440 and one dimensional loop instructions 450. The vector processor 260 executes the loop configuration instructions 440 prior to the one dimensional loop instructions 450. The loop configuration instructions 440 configure three of the multi-dimensional address generators 370, compute the upper bound for a single loop index "i," and configure the branch and predicate unit 328 to initialize two flags. The vector processor 260 executes the one dimensional loop instructions 450 as a single cycle. Because the vector processor 260 conditionally executes the multiply-add operation every cycle, the resources of the vector processor 260 are not wasted. Further, the one dimensional loop has zero loop overhead. Consequently, the performance of the vector processor 260 is optimized.

Figure 5:
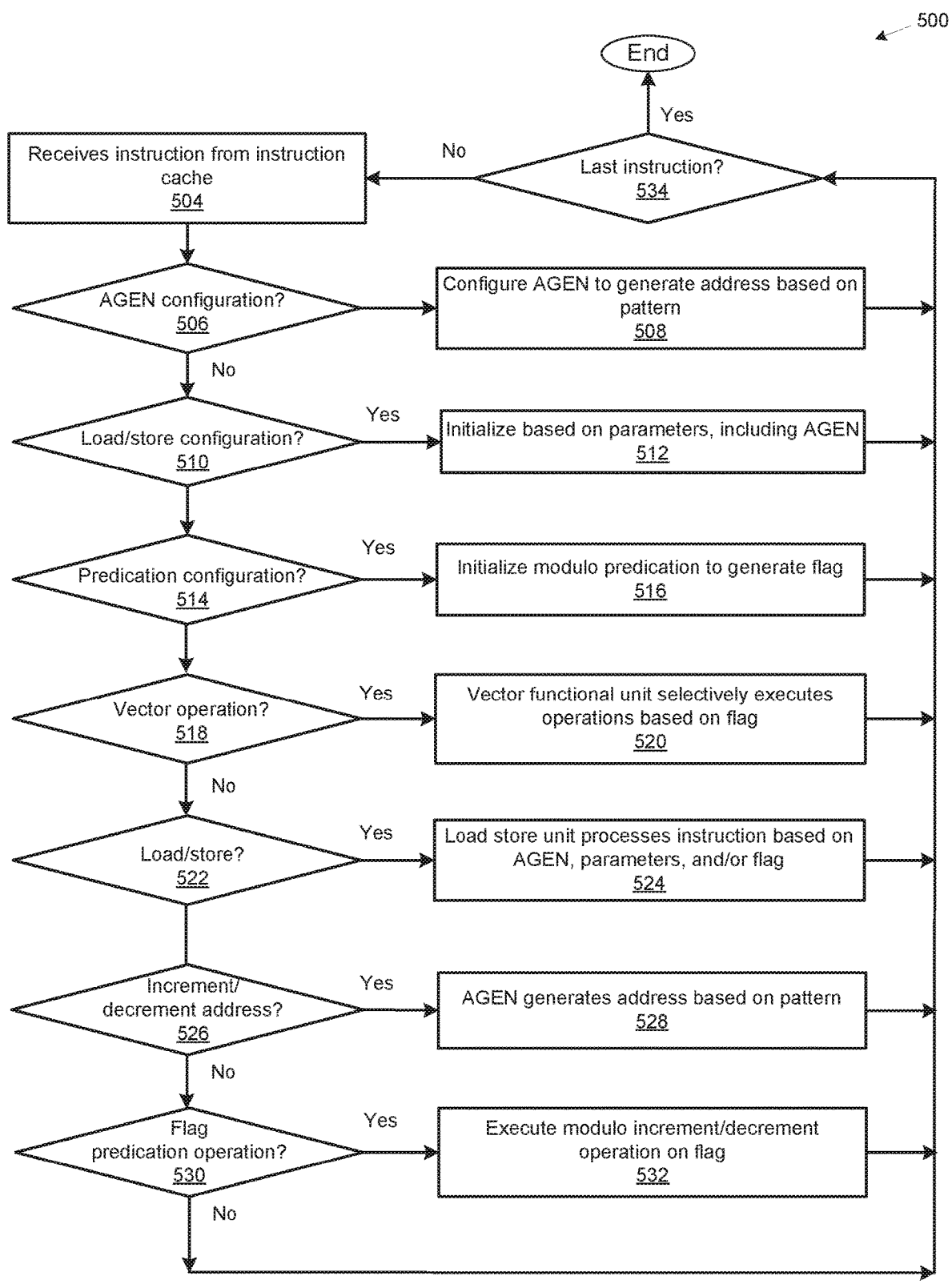
FIG. 5 is a flow diagram of method steps for executing collapsed multi-dimensional loop application code on a vector processor, according to various embodiments of the present invention.

FIG. 5 is a flow diagram of method steps for executing collapsed multi-dimensional loop application code on a vector processor, according to various embodiments of the present invention. Although the method steps are described in conjunction with the systems of FIGS. 1-4, persons skilled in the art will understand that any system configured to implement the method steps, in any order, falls within the scope of the present invention. Further, persons skilled in the art will understand and appreciate, the vector processor 260 supports many instructions that are not involved in enabling multi-dimensional loop collapsing. For clarity and discussion purposes only, the method steps focus on operations related to multi-dimensional collapsing.

As shown, a method 500 begins at step 504, where the front end unit 320 included in the vector processor 260 receives an instruction from the instruction cache 310. At step 504, the front end unit 320 determines whether the instruction involves configuring one of the multi-dimensional address generators 370.

If, at step 504, the front end unit 320 determines that the instruction involves configuring one of the multi-dimensional address generators 370, then the method 500 proceeds to step 506. At step 506, the front end unit 320 dispatches the instruction to the multi-dimensional address generator 370. In general, the instruction specifies an object, a number of dimensions, a base address, a number of iterations for each dimension, and a weight for each dimension. Upon receiving the instruction, the multi-dimensional address generator 370 computes address modifiers that establish a one dimensional pattern associated with accessing the object. The multi-dimensional address generator 370 may compute the address modifiers in any technically feasible fashion based on the number of dimensions, the number of iterations for each dimension, and the weight for each dimension. The method 500 then proceeds directly to step 534, described below.

If, however, at step 506, the front end unit 320 determines that the instruction does not involve configuring one of the multi-dimensional address generators 370, then the method 500 proceeds directly to step 510. At step 510, the front end unit 320 determines whether the instruction involves configuring one of the load/store units 360. If, at step 510, the front end unit 320 determines that the instruction involves configuring one of the load/store units 360, then the method 500 proceeds to step 512.

At step 512, the front end unit 320 dispatches the instruction to the load store unit 360. The instruction specifies an object, the multi-dimensional address generator 370 associated with the object, and any number of parameters. The load/store unit 326 may configure the association with the multi-dimensional address generator 370 in any technically feasible fashion. For example, in some embodiments, each of the load/store units 360 stores an identifier for the associated multi-dimensional address generator 270 as an AGEN parameter in memory. The parameters include a saturation parameter and a rounding parameter. In alternate embodiments, the load/store unit 326 may support any number of configuration parameters in any technically feasible fashion. The method 500 then proceeds directly to step 534, described below.

If, however, at step 510, the front end unit 320 determines that the instruction does not involve configuring one of the load/store units 360, then the method proceeds directly to step 514. At step 514, the front end unit 320 determines whether the instruction involves configuring the branch and predicate unit 328. If, at step 514, the front end unit 320 determines that the instruction involves configuring the branch and predicate unit 328, then the method 500 proceeds to step 516.

At step 516, the front end unit 320 dispatches the instruction to the branch and predicate unit 328. The instruction specifies an initialization constant. In response to receiving the instruction, the branch and predicate unit 328 initializes a flag based on the initialization constant. The flag may be attached to a subsequent instruction to control conditional execution of the subsequent instruction. The method 500 then proceeds to step 534, described below.

If, however, at step 514. the front end unit 320 determines that the instruction does not involve configuring the branch and predicate unit 328, then the method 500 proceeds directly to step 518. At step 518, the front end unit 320 determines whether the instruction involves a vector operation. If, at step 518, the front end unit 320 determines that the instruction involves a vector operation, then the method 500 proceeds to step 520.

At step 520, the front end unit 320 dispatches the instruction to one of the vector units 350. The instruction may specify any type of vector operation in any technically feasible fashion that is consistent with the functionality of the vector unit 350. Further, the instruction may include a flag that controls the execution of operations specified in the instruction. If the instruction includes a flag, then the vector unit 350 selectively executes any number of operations specified in the instruction based on the flag. If the instruction does not include a flag, then the vector unit 350 executes the operations specified in the instruction.

If, however, at step 518, the front end unit 320 determines that the instruction does not involve a vector operation, then the method 500 proceeds directly to step 522. At step 522, the front end unit 320 determines whether the instruction involves a load/store operation. If, at step 522, the front end unit 320 determines that the instruction involves a load/store operation, then the method proceeds to step 524.

At step 524, the front end unit 320 dispatches the instruction to the load store unit 360. Upon receiving the instruction, the load/store unit 326 executes based on any combination of the associated multi-dimensional address generator 270, the parameters, and an optional flag attached to the instruction. In particular, the load/store unit 326 computes an address for the object associated with the instruction based on the associated multi-dimensional address generator 270 and then increments/decrements the address. The load/store unit 326 then executes operations on the object based on the optional parameters and the optional flag. As a general matter, the instruction may specify any number and types of operations in any technically feasible fashion that is consistent with the capabilities and the configuration of the load store unit 360. The method 500 then proceeds directly to step 534, described below.

If, however, at step 522, the front end unit 320 determines that the instruction does not involve a load/store operation, then the method proceeds directly to step 526. At step 526, the front end unit 320 determines whether the instruction involves one of the multi-dimensional address generators 370 and an increment or decrement operation. If, at step 526, the front end unit 320 determines that the instruction involves one of the multi-dimensional address generators 370 and an increment or decrement operation, then the method 500 proceeds to step 528.

At step 528, the front end unit 320 dispatches the instruction to the multi-dimensional address generator 370. Upon receiving the instruction, the multi-dimensional address generator 370 computes an address for the object associated with the multi-dimensional address generator 370 based on the configured address pattern. The multi-dimensional address generator 370 then increments or decrements the address, and the method 500 proceeds directly to step 534, described below.

If, however, at step 526, the front end unit 320 determines that the instruction does not involve one of the multi-dimensional address generators 370 or an increment or decrement operation, then the method 500 proceeds directly to step 530. At step 530, the front end unit 320 determines whether the instruction involves a flag predication operation.

If, at step 530, the front end unit 320 determines that the instruction involves a flag predication operation, then the method 500 proceeds to step 532. At step 532, the front end unit 320 dispatches the instruction to the branch and predicate unit 328. Upon receiving the instruction, the branch and predicate unit 328 executes a modular increment or decrement operation on the flag. The method 500 then proceeds to step 534, described below. If, however, at step 530, the front end unit 320 determines that the instruction does not involve a flag predication operation, then the method 500 proceeds directly to step 534.

At step 534, the front end unit 320 determines whether the instruction is the last instruction included in the instruction cache 310. If, at step 534, the front end unit 320 determines that the instruction is not the last instruction included in the instruction cache 310, then the method returns to step 504, where the front end unit 320 receives the next instruction included in the instruction cache 310. The vector processor 260 continues to cycle through steps 504-534, processing instructions until the vector processor 260 finishes processing all the instructions included in the instruction cache 310. If, however, at step 534, the front end unit 320 determines that the instruction is the last instruction included in the instruction cache 310, then the method 500 terminates.

As persons skilled in the art will recognize, any number of the steps included in the method 500 can be performed in parallel. Further, many modifications and variations will be apparent to those of ordinary skill in the art without departing from the scope and spirit of the described embodiments. For example, in some embodiments, at step 504, the front end unit 320 included in the vector processor 260 may receive a very long instruction word (VLIW) packet from the instruction cache 310. The VLIW packet may include up to seven instructions. Subsequently, various components included in the vector processor 260 may execute any combination of steps 506, 510, 514, 518, 522, 526, and 530 substantially in parallel.

Additional Architectural Optimizations

In alternate embodiments, the vector processor 260 may implement any number of other features to optimize the performance of the vector processor 260 while executing the computer vision applications 103. For example, in some embodiments, the vector processor 260 optimizes the memory 215 to streamline memory access patterns commonly associated with computer vision algorithms. One such memory access pattern involves loading data from an input array, loading data from a coefficient array, and storing data in an output array during execution of a one dimensional collapsed loop. To enable the load/store units 360 to access these three arrays in a single cycle, the memory 215 is configured to process multiple addresses associated with a single memory access.

More specifically, referring back to FIG. 3, the memory 215 includes, without limitation, the data memory interface 392 and multiple data super banks 394. Each of the data super banks 392 is further subdivided into banks of a fixed size. For example, in some embodiments, each of the data super banks 392 includes thirty-two 16-bit banks. The data memory interface 392 includes separate addresses for each of the banks. Accordingly, each of the banks may be individually addressed as part of a single memory access. The data memory interface 392 assembles the data returned from the data super banks 392 into a non-contiguous data "block" that the data memory interface 392 returns to the requesting units.

Notably, if the data super bank 394(1) stores an input array, the data super bank 392(2) stores a coefficient array, and the data support bank 394(3) stores an output array, then the load/store units 360 may access these three arrays in a single cycle. As persons skilled in the art will recognize, the organization of the memory 215 described herein enables flexible memory accesses including non-aligned consecutive vector accesses, transposition, parallel lookup, and parallel histogram.

In other embodiments, the vector processor 260 is configured to reduce latency associated with requesting data from the memory 215 based on specialized addressing modes implemented via the multi-dimensional address generators 370. Reducing such latency typically improves the overall performance of the computer vision applications 103 executing on the vector processor 260. Two such addressing modes are a decoupled load/store stream mode and a circular buffer addressing mode.

Referring back to FIG. 3, the vector processor 260 may include any number of decoupled load/store stream units 362. The load/store stream units 362 pre-configure load/store streams based on the multi-dimensional address generators 370. More specifically, the load streams preemptively load data based on addresses generated by the multi-dimensional address generators 370. In operation, each of the load streams executes asynchronously to the instructions included in the instruction cache 310. Each of the load streams temporarily stores loaded data in a first in, first out (FIFO) buffer associated with the load stream. Each of the store streams temporarily stores to-store data in a first in, first out (FIFO) associated with the store stream. In general, each of the load/store streams may schedule loads and stores in an opportunistic manner to reduce stalls from memory conflicts and improve overall efficiency. For example, the load/store streams may prioritize load operations over store operations to ensure that instructions are not stalled while the load/store units 360 load data.

In some embodiments, in addition to the linear, multi-dimensional addressing described previously herein, the vector processor 260 may implement circular buffer addressing. In such embodiments, memory transactions may be tagged with circular buffer addressing logic to efficiently implement data reuse in sliding-window buffers without requiring additional processing cycles. A sliding-window buffer is a linear range in a memory included in the vector processor 260 allocated to hold a 2D block stored in memory external to the vector processor 260. For many computer vision applications, the block width and height do not exceed, and are often much smaller, than the width and height of the visual input data. In operation, the vector processor 260 employs tile-based processing to generate one non-overlapping output tile at a time. However, the size of the input data required to produce each output tile often exceeds the size of the output tile.

Circular addressing configures the vector processor 260 to reuse the overlapping input data between output tiles without re-reading the overlapping data using the DMA 270. More specifically, when the circular buffer addressing mode is enabled for a memory included in the vector processor 260, the vector processor 260 wraps the memory accesses associated with the memory inside designated circular buffers. The circular buffer addressing mode may be enabled in any technically feasible fashion. For example, in some embodiments, the circular buffer addressing mode is enabled by a field included in the upper bits of a base address word.

In view of the foregoing, persons of ordinary skill in the art will appreciate that the architecture described in FIGS. 1-4 in no way limits the scope of the present invention.

In sum, the disclosed techniques enable a computer vision subsystem to efficiently execute a wide variety of computer vision algorithms. In general, the computer vision subsystem includes one or more programmable vision accelerators (PVAs). The architecture of the PVA is designed to optimize a rich and configurable set of operations included in many computer vision algorithms. Further, the PVA is configurable based on high-level programming techniques, such as high-level programming languages and/or high-level application programming interfaces.

In particular, the PVA includes architectural features that allow applications to reduce the iteration overhead typically associated with executing a multi-dimensional loop. In operation, an application collapses a multi-dimensional loop to a one dimensional loop based on programmable features included in the PVA. More specifically, the application includes configuration instructions that configure the PVA to emulate multi-dimensional looping functionality followed by operational instructions included a one dimensional loop. To enable such loop collapsing, the PVA includes, without limitation, multi-dimensional address generators that generate addresses based on configurable address patterns, load/store units that include rounding and/or saturation parameters, and branch and predicate units that enable customized flag generation based on modulo predication operations.

At least one advantage of the disclosed approach is that the computer vision subsystem achieves high performance levels when executing computer vision algorithms without sacrificing flexibility. More specifically, unlike many CPUs, the computer vision subsystem enables a wide range of real-time computer vision algorithms to meet performance requirements, such as those related to execution time and power consumption, for example. Further, unlike specialized hardware units, the computer vision subsystem optimizes relatively generic algorithms that are applicable to a diverse range of computer vision applications across different types and amounts of visual data. In addition, the high-level programmability and flexibility provided by the computer vision subsystem minimize the time required to implement new computer vision algorithms and/or scale existing algorithms.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A system for executing a collapsed multi-dimensional loop, the system comprising:
    a memory that stores a loop configuration instruction for a multi-dimensional loop and stores a plurality of loop instructions included in a one-dimensional loop;
    a multi-dimensional address generator that generates a plurality of addresses according to an address pattern by:
        precomputing an address modifier for each dimension included in the multi-dimensional loop based on a respective number of iterations for each dimension included in the multi-dimensional loop and a respective weight associated with each dimension included in the multi-dimensional loop; and
        after precomputing the address modifiers for the dimensions of the multi-dimensional loop, generating the plurality of addresses by iteratively applying the precomputed address modifiers to a base address when a corresponding loop index is incremented;
    a load/store unit that accesses an object based on a first address from the plurality of addresses; and a vector unit that performs one or more operations on the object based on a first loop instruction included in the plurality of loop instructions.

2. The system of claim 1, wherein the loop configuration instruction further specifies a plurality of iteration numbers and a plurality of iteration weights.

3. The system of claim 1, wherein the multi-dimensional address generator further performs an increment or decrement operation based on the address pattern and a second loop instruction included in the plurality of loop instructions.

4. The system of claim 1, wherein at least one of the plurality of loop instructions is associated with a flag, and the system further comprises a branch/predicate unit that generates the flag.

5. The system of claim 4, wherein the branch/predicate unit comprises a modulo counter.

6. The system of claim 1, wherein the loop configuration instruction comprises a very long instruction word (VLIW) instruction.

7. The system of claim 1, wherein the load/store unit includes saturation logic, at least one of the plurality of loop instructions specifies a saturation option, and the saturation logic performs a saturation operation on the object based on the saturation option.

8. The system of claim 1, wherein the load/store unit includes rounding logic, at least one of the plurality of loop instructions specifies a rounding option, and the rounding logic performs a rounding operation on the object based on the rounding option.

9. The system of claim 1, wherein at least one of the plurality of loop instructions specifies at least one of a data type and a data distribution option.

10. The system of claim 1, wherein the first address is further based on a first modifier included in the address pattern that is associated with a current iteration of the one-dimensional loop.

11. A computer-implemented method for executing a collapsed multi-dimensional loop, the method comprising:
receiving a configuration instruction for a multi-dimensional loop;
generating a plurality of addresses according to an address pattern by:
precomputing an address modifier for each dimension included in the multi-dimensional loop based on a respective number of iterations for each dimension included in the multi-dimensional loop and a respective weight associated with each dimension included in the multi-dimensional loop; and
after precomputing the address modifiers for the dimensions of the multi-dimensional loop, generating the plurality of addresses by iteratively applying the precomputed address modifiers to a base address when a corresponding loop index is incremented; and
executing the collapsed multi-dimensional loop as a single loop based on the plurality of addresses by accessing an object based on a first address from the plurality of addresses.

12. The method of claim 11, wherein executing the collapsed multi-dimensional loop comprises performing one or more operations on the object accessed based on the plurality of addresses.

13. The method of claim 11, wherein executing the collapsed multi-dimensional loop comprises performing an increment or decrement operation on the object accessed based on the plurality of addresses.

14. The method of claim 11, wherein the configuration instruction further specifies a plurality of iteration numbers and a plurality of iteration weights.

15. The method of claim 11, wherein executing the collapsed multi-dimensional loop comprises accessing the object based on the plurality of addresses.

16. The method of claim 15, wherein accessing the object is further based on at least one of a data type and a distribution type.

17. The method of claim 15, wherein executing the collapsed multi-dimensional loop further comprises executing one or more operations on the object based on at least one of a saturation option and a rounding option.

18. The method of claim 11, wherein executing the collapsed multi-dimensional loop comprises:
computing a flag; and
conditionally controlling, based on the flag, operations on the object accessed based on the plurality of addresses.

19. The method of claim 18, wherein computing the flag comprises performing a modulo operation on a counter variable that is associated with the flag.

20. The method of claim 11, wherein executing the collapsed multi-dimensional loop comprises:
computing a flag;
if the flag matches a first condition, then executing a first operation on the object accessed based on the plurality of addresses; or
if the flag does not match an activation condition, then executing a second operation on the object accessed based on the plurality of addresses.

21. A system for executing a computer vision application, the system comprising:
a programmable vector processor that:
executes a collapsed multi-dimensional loop included in the computer vision application as a single loop based on a plurality of addresses generated according to an address pattern by:
precomputing an address modifier for each dimension included in the multi-dimensional loop based on a respective number of iterations for each dimension included in the multi-dimensional loop and a respective weight associated with each dimension included in the multi-dimensional loop; and
after precomputing the address modifiers for the dimensions of the multi-dimensional loop, generating the plurality of addresses by iteratively applying the precomputed address modifiers to a base address when a corresponding loop index is incremented in order to access an object based on a first address from the plurality of addresses;
a fixed-function accelerator that accelerates a fixed processing operation included in the computer vision application; and
a reduced instruction set computer (RISC) core that coordinates the programmable vector processor and the fixed-function accelerator.

* * * * *